(12) United States Patent
Harris et al.

(10) Patent No.: US 7,297,665 B2
(45) Date of Patent: *Nov. 20, 2007

(54) FLUIDS COMPRISING ZIRCONIUM ISOPROPYLAMINE CROSSLINKING AGENTS AND ASSOCIATED METHODS

(75) Inventors: Phillip C. Harris, Duncan, OK (US); Stanley J. Heath, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 223 days.

This patent is subject to a terminal disclaimer.

(21) Appl. No.: 11/101,006

(22) Filed: Apr. 7, 2005

(65) Prior Publication Data

US 2006/0229213 A1  Oct. 12, 2006

(51) Int. Cl.
C09K 8/56 (2006.01)
C09K 8/68 (2006.01)

(52) U.S. Cl. .................. 507/271; 507/209; 507/272; 507/273

(58) Field of Classification Search ............... 507/271
See application file for complete search history.

(56) References Cited

U.S. PATENT DOCUMENTS

| | | | |
|---|---|---|---|
| 4,250,044 A | 2/1981 | Hinkel | 252/8.55 |
| 4,460,751 A | 7/1984 | Hanlon et al. | |
| 4,477,360 A | 10/1984 | Almond | 252/8.55 |
| 4,604,218 A * | 8/1986 | Dawson | 507/222 |
| 4,624,795 A * | 11/1986 | Dawson et al. | 507/205 |
| 4,664,713 A | 5/1987 | Almond et al. | 106/209 |
| 4,799,550 A | 1/1989 | Harris et al. | |
| 4,801,389 A * | 1/1989 | Brannon et al. | 507/211 |
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 5,165,479 A | 11/1992 | Harris et al. | |
| 5,182,408 A | 1/1993 | Sharif | 556/55 |
| 2002/0125012 A1 * | 9/2002 | Dawson et al. | 507/211 |
| 2006/0225884 A1 | 10/2006 | Harris et al. | |

FOREIGN PATENT DOCUMENTS

| | | |
|---|---|---|
| EP | 0 302 544 A2 | 7/1988 |
| WO | WO 02/055843 A1 | 7/2002 |

* cited by examiner

*Primary Examiner*—Randy Gulakowski
*Assistant Examiner*—John J. Figueroa
(74) *Attorney, Agent, or Firm*—Robert A. Kent; Fletcher, Yoder & Someren

(57) ABSTRACT

Treatment fluids that may comprise an aqueous fluid, a gelling agent, and a zirconium triisopropylamine crosslinking agent are provided. Also provided are crosslinking agents that may comprise a zirconium triisopropylamine crosslinking agent, and a zirconium IV-containing crosslinking agent.

20 Claims, 2 Drawing Sheets

FLUIDS COMPRISING ZIRCONIUM ISOPROPYLAMINE CROSSLINKING AGENTS AND ASSOCIATED METHODS

CROSS-REFERENCE TO RELATED APPLICATIONS

The present invention is related to copending U.S. application Ser. No. 11/100,973 entitled "Fluids Comprising Zirconium Isopropylamine Crosslinking Agents and Associated Methods," filed concurrently herewith, the entire disclosure of which is incorporated herein by reference.

BACKGROUND

The present invention relates generally to the treatment of subterranean formations with crosslinked treatment fluids, and more particularly to treatment fluids that comprise a zirconium isopropylamine crosslinking agent and associated methods.

A variety of subterranean treatments using crosslinked treatment fluids have been developed. One subterranean treatment that uses a crosslinked treatment fluid for stimulating production from a subterranean formation is a fracturing treatment. Fracturing treatments generally involve pumping a crosslinked treatment fluid (e.g., a fracturing fluid) into a subterranean formation at a pressure sufficient to create or enhance one or more fractures in the subterranean formation. The fracturing fluid generally has a viscosity that is sufficient to suspend proppant particulates and to place the proppant particulates in fractures, inter alia, to maintain the integrity of those fractures once the hydraulic pressure is released. Once at least one fracture is created and the proppant particulates are substantially in place, the viscosity of the fracturing fluid usually is reduced, and the fluid may be recovered from the formation. Other treatments that use crosslinked treatment fluids include, but are not limited to, sand control treatments (e.g., gravel packing), drilling operations, polymer floods, and forming temporary plugs or blocks in subterranean formations, and the like.

Crosslinked treatment fluids generally comprise an aqueous fluid and a crosslinked gelling agent, wherein the crosslinked gelling agent may be the reaction product of a reaction that comprises a gelling agent and a crosslinking agent. This reaction between the gelling agent and the crosslinking agent is commonly referred to as "crosslinking." Preparation of these crosslinked treatment fluids typically involves combining the aqueous fluid with the gelling agent. An optional buffer also may be included to provide an appropriate pH for hydration of the gelling agent and crosslinking. Next, a crosslinking agent may added for crosslinking one or more gelling agent molecules. Generally, the crosslinking may occur very slowly and/or not at all while the treatment fluid is at or below ambient temperature. As used herein, "ambient temperature" refers to a moderate temperature range normally encountered on the surface. For instance, certain crosslinking agents, such as zirconium lactate, may require temperatures greater than about 85° F. to about 90° F. to initiate crosslinking.

After preparation, the treatment fluid may be placed into a subterranean formation through a well bore. Because most subterranean formations are relatively hot, e.g., having temperatures in the range of from about 100° F. to about 400° F., the treatment fluid may be heated as it passes through the well bore and into the subterranean formation. As the treatment fluid heats to temperatures greater than ambient temperatures, crosslinking may occur to form a crosslinked treatment fluid that may have a desired viscosity for a particular application (e.g., proppant transport). Treatment fluids, such as those described above, may be described as delayed crosslinking aqueous gels because crosslinking does not occur or occurs very slowly prior to introduction of the treatment fluid into the well bore. An example of a delayed crosslinking aqueous gel comprises an organic carboxylated gelling agent, an aqueous fluid, a buffer (capable of maintaining the pH of the fluid at about 5 or above), and a zirconium IV-containing crosslinking agent.

However, in some instances, the aqueous fluid used to form the gelled treatment fluids may be relatively cool (e.g., below about 70° F.) and may even have temperatures as low as about 35° F. Where these relatively cool aqueous fluids are used, the formation temperatures may not be sufficient to heat the gelled treatment fluids to temperatures suitable for crosslinking while the gelled treatment fluids are resident in the well bore. If these temperatures are not reached, the gelled treatment fluids may be introduced into the subterranean formation with little or no crosslinking, and thus the gelled treatment fluids may not have viscosities sufficient for the particular applications. This problem may be particularly apparent in relatively shallow wells where the time the gelled treatment fluid is resident in the well bore may be short when compared to deeper wells.

SUMMARY

The present invention relates generally to the treatment of subterranean formations with crosslinked treatment fluids, and more particularly to treatment fluids that comprise a zirconium isopropylamine crosslinking agent and associated methods.

An embodiment of the present invention provides a treatment fluid. In an example of such a treatment fluid, the treatment fluid of the present invention may comprise an aqueous fluid, a gelling agent, and a zirconium triisopropylamine crosslinking agent. In another example of such a treatment fluid, the treatment fluid of the present invention may comprise an aqueous fluid; a buffer; a clay control agent; an organic carboxylated gelling agent; a zirconium triisopropylamine crosslinking agent; and a Zirconium IV-containing crosslinking agent; wherein the treatment fluid has a pH in the range of from about 4 to about 6.

Another embodiment of the present invention provides a crosslinking agent that may comprise a zirconium triisopropylamine crosslinking agent, and a zirconium IV-containing crosslinking agent.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention and should not be used to limit or define the invention.

DESCRIPTION OF PREFERRED EMBODIMENTS

Figure 1:
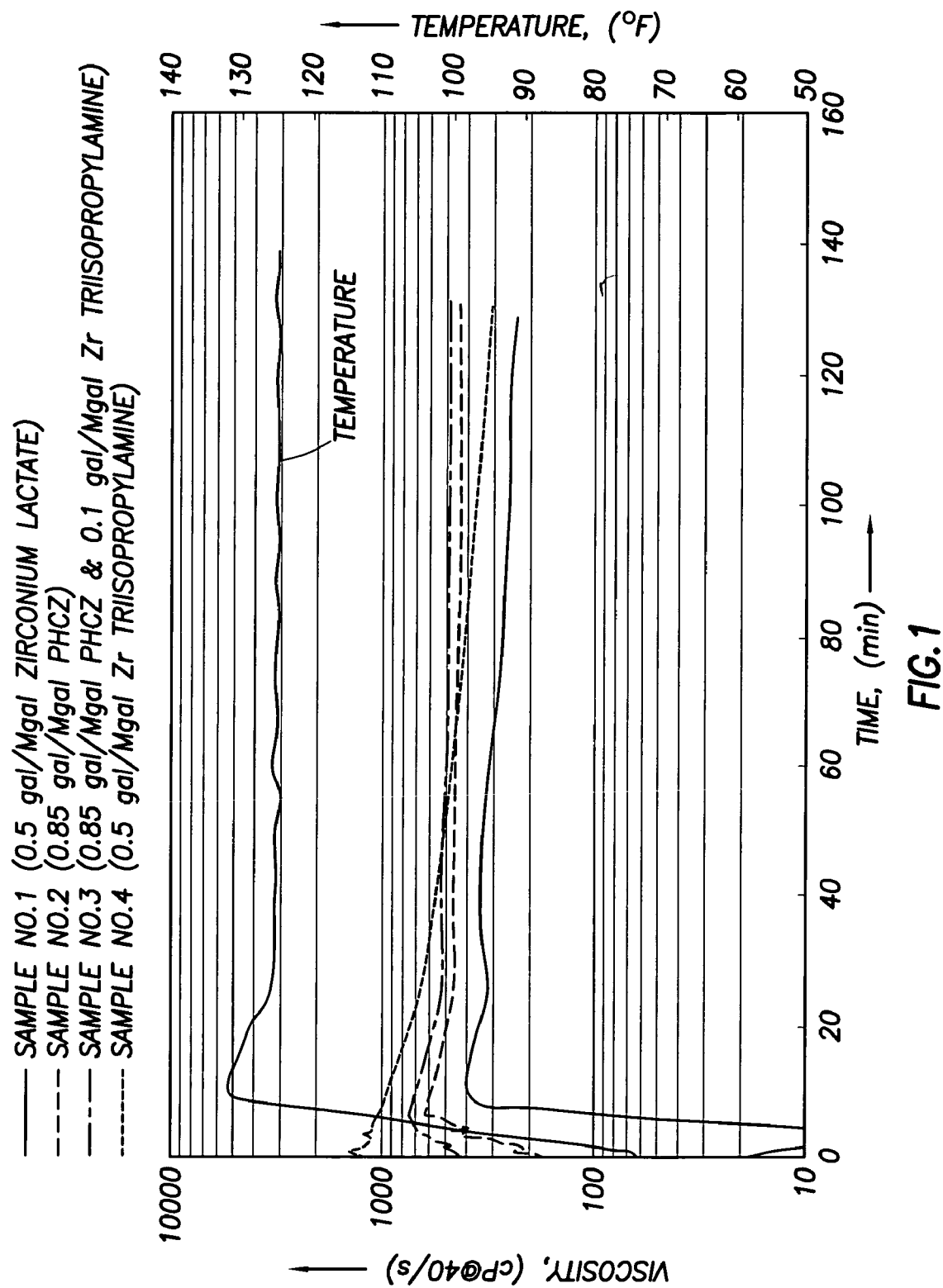
FIG. 1 is a plot of temperature and viscosity versus time as measured using a Fann® Model 50 viscometer for sample fluids in accordance with one embodiment of the present invention and control sample fluids.

The present invention relates generally to the treatment of subterranean formations with crosslinked treatment fluids, and more particularly to treatment fluids that comprise a zirconium isopropylamine crosslinking agent and associated methods.

The treatment fluids of the present invention generally comprise an aqueous fluid, a gelling agent, and a zirconium isopropylamine crosslinking agent. Under the appropriate conditions (e.g., pH, temperature, etc.), crosslinking may occur between at least a portion of the gelling agent and at least a portion of the zirconium isopropylamine crosslinking agent to form an at least partially crosslinked gelling agent. In some embodiments, a second crosslinking agent may be included in the treatment fluids of the present invention in addition to the zirconium isopropylamine crosslinking agent. Additional additives may be included in the treatment fluid as desired by one skilled in the art, with the benefit of this disclosure, dependent on the particular application. Such additives may include, but are not limited to, buffers, clay control agents, gases, foaming agents, delayed gel breakers, and a variety of other suitable additives.

Suitable aqueous fluids used to form the treatment fluids of the present invention include, but are not limited to, saltwater, brines, seawater, freshwater. Generally, the aqueous fluid may be from any source, provided that it does not contain components that may adversely affect other components in the treatment fluids of the present invention.

A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. Suitable gelling agents may comprise polymers, synthetic polymers, or a combination thereof. In certain embodiments, suitable gelling agents may comprise polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gum and derivatives thereof, such as hydroxyethyl guar, hydroxypropyl guar, carboxymethyl guar, carboxymethylhydroxyethyl guar, and carboxymethylhydroxypropyl guar ("CMHPG"); and a cellulose or a derivative thereof, such as hydroxyethyl cellulose, carboxyethylcellulose, carboxymethylcellulose, and carboxymethylhydroxyethylcellulose; and combinations thereof. In certain embodiments, the gelling agents comprise an organic carboxylated gelling agent, such as CMHPG. In certain embodiments, the derivatized cellulose is a cellulose grafted with an allyl or a vinyl monomer, such as those disclosed in U.S. Pat. Nos. 4,982,793; 5,067,565; and 5,122,549, the relevant disclosures of which are incorporated herein by reference. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone, and derivatives thereof. The gelling agents listed above may be included in the treatments fluids of the present invention separately or in combination.

Suitable gelling agents may be present in the treatment fluids of the present invention in an amount sufficient to provide the desired viscosity. In some embodiments, the gelling agents may be present in the treatment fluids of the present invention in an amount in the range of from about 0.01% to about 5% by weight of the aqueous fluid. In certain embodiments, the gelling agents may be present in the treatment fluids of the present invention in an amount in the range of from about 0.01% to about 2% by weight of the aqueous fluid.

The zirconium isopropylamine crosslinking agents useful in the present invention may be capable of initiating crosslinking of the gelling agent in the treatment fluids of the present invention at temperatures below about 70° F. In certain embodiments, the zirconium isopropylamine crosslinking agents may be capable of initiating crosslinking at temperatures below about 60° F. And in certain embodiments, the zirconium isopropylamine crosslinking agents may be capable of initiating crosslinking at temperatures down to about 35° F.

The zirconium isopropylamine crosslinking agents contain at least one zirconium IV ion that is capable of crosslinking at least two gelling agent molecules. Suitable isopropylamine crosslinking agents include, but are not limited to, zirconium triisopropylamine, zirconium triisopropylamine lactate, zirconium diisopropylamine, and zirconium diisopropylamine lactate, and derivatives thereof and combinations thereof. It has been found that the use of zirconium triisopropylamine as a crosslinking agent can initiate crosslinking at low temperatures (e.g., down to about 35° F.). Moreover, the zirconium isopropylamine crosslinking agents useful in the present invention may be capable of initiating crosslinking under relatively high salt concentrations. In certain embodiments, a zirconium isopropylamine crosslinking agent useful in the present invention has been show to produce a crosslinked treatment fluid at a pH between about 4 and about 6 while at 50° F. and in the presence of about 7% KCl.

The zirconium isopropylamine crosslinking agents generally are present in the treatment fluids of the present invention, among other things, to provide the desired degree of crosslinking between gelling agent molecules. In certain embodiments, the zirconium isopropylamine crosslinking agents generally may be present in an amount in the range of from about 0.001% to about 10% by weight of the aqueous fluid. In certain embodiments, the zirconium isopropylamine crosslinking agents may be present in the treatment fluids of the present invention in an amount in the range of from about 0.01% to about 2% by weight of the aqueous fluid. Individuals skilled in the art, with the benefit of this disclosure, will recognize the exact type and amount of crosslinking agent to use depending on a number of factors, such as the specific gelling agent, desired viscosity, and formation conditions.

The treatment fluids of the present invention optionally may comprise a buffer. Buffers may be included in the treatment fluids of the present invention to provide a desired pH, for example, a pH suitable for crosslinking and/or hydration of the gelling agent. In certain embodiments, the buffer should be capable of maintaining the treatment fluids of the present invention at a pH of between about 4 and about 12. And in certain embodiments, the buffer should be capable of maintaining the pH between about 4 and about 6. One skilled in the art will recognize that a number of suitable buffers may be used to accomplish this task, such as sodium acetate, ammonium acetate, acetic acid, sodium carbonate, potassium carbonate, sodium bicarbonate, potassium bicarbonate, sodium or potassium diacetate, sodium hydroxide, potassium hydroxide, and lithium hydroxide, and combinations thereof and derivatives thereof. In certain embodiments, the buffer comprises a mixture of acetic acid and sodium carbonate. In certain embodiments, the buffer comprises a mixture of acetic acid and ammonium acetate.

Generally, the buffer may be present in the treatment fluids of the present invention in an amount sufficient to maintain the pH in, or adjust the pH to, a desired value or range. In certain embodiments, the buffer may be present in the treatment fluids of the present invention in an amount in the range of from about 0.001% to about 1% by weight of the aqueous fluid.

In some embodiments, a second crosslinking agent may be included in the treatment fluids of the present invention in addition to the zirconium isopropylamine crosslinking agent. The second crosslinking agent generally comprises at least one ion that is capable of crosslinking at least two gelling agent molecules. Examples of suitable crosslinking agents include, but are not limited to, compounds that can supply boron ions (such as, for example, boric acid, disodium octaborate tetrahydrate, sodium diborate, pentaborates, ulexite and colemanite); compounds that can supply zirconium IV ions (such as, for example, zirconium lactate, zirconium lactate triethanolamine, zirconium carbonate, zirconium acetylacetonate, zirconium malate, zirconium citrate, and polyhydroxy complexes of zirconium); compounds that can supply titanium IV ions (such as, for example, titanium lactate, titanium malate, titanium citrate, titanium ammonium lactate, polyhydroxy complexes of titanium, titanium triethanolamine, and titanium acetylacetonate); aluminum compounds (such as, for example, aluminum lactate or aluminum citrate); antimony compounds; chromium compounds; iron compounds; copper compounds; or zinc compounds; or a combination thereof or a derivative thereof. In certain embodiments, the second crosslinking agent comprises a compound that can supply zirconium IV ions, such as a zirconium IV-containing crosslinking agent. An example of a suitable polyhydroxy complex of zirconium is described in U.S. Pat. No. 4,460,751, the relevant disclosure of which is incorporated herein by reference. Where a second crosslinking agent is used in addition to the zirconium isopropylamine crosslinking agent, the zirconium isopropylamine crosslinking may be used, in some embodiments, as an accelerant, for example, if the aqueous fluid is at relatively low temperatures (e.g., less than about 70° F.), so that the zirconium isopropylamine crosslinking agent initiates crosslinking at temperatures less than 70° F.

The second crosslinking agent generally may be present in the treatment fluids of the present invention in an amount sufficient to provide, among other things, the desired degree of crosslinking between gelling agent molecules. In certain embodiments, the second crosslinking agent may be present in an amount in the range from about 0.001% to about 10% by weight of the aqueous fluid. In certain embodiments, the second crosslinking agent may be present in the treatment fluids of the present invention in an amount in the range from about 0.01% to about 1% by weight of the aqueous fluid. Individuals skilled in the art, with the benefit of this disclosure, will recognize the exact type and amount of the second crosslinking agent to use depending on a number of factors, such as the specific gelling agent, desired viscosity, and formation conditions.

Further, the treatment fluids of the present invention optionally may be foamed using a suitable gas (such as carbon dioxide, air, or nitrogen, or a combination thereof) and a foaming agent. Suitable foaming agents, include, but are not limited to, cationic, anionic, nonionic, or amphoteric surfactants, such as, for example, betaines, sulfated or sulfonated alkoxylates, alkyl quaternary amines, alkoxylated linear alcohols, alkyl sulfonates, alkyl aryl sulfonates, alkyl aryl alkoxylates, amine oxides, and $C_{10}$-$C_{20}$ alkyldiphenyl ether sulfonates, and combinations thereof. The particular foaming agent employed will depend upon the type of formation which is to be fractured, the treatment fluid chosen, and the percentage of gas in the final foam. In certain embodiments, the foaming agent may be mixed with the treatment fluid of the present invention before the gas is added to facilitate uniform mixing and to assist in stabilizing the two phase structure of the foam. One of ordinary skill in the art, with the benefit of this disclosure, will be able to select the appropriate amount and type of foaming agent and gas for a particular application.

The treatment fluids of the present invention may further comprise a delayed gel breaker such as enzyme, oxidizing, acid, or temperature-activated gel breakers. Gel breakers may be used to reduce the viscosity of an aqueous gel once a subterranean treatment is substantially complete. In certain embodiments, the gel breaker used may be present in the treatment fluids of the present invention in an amount in the range of from about 0.05% to about 10% by weight of the gelling agent.

Individuals skilled in the art, with the benefit of this disclosure, will recognize that additional additives may be included in the treatment fluids of the present invention as desired for a particular application. Such additives may include, but are not limited to, proppant particulates, clay control agents, corrosion inhibitors, biocides, friction reducers, gel stabilizers, fluid loss control additives, bactericides, and surfactants, and combinations thereof. Suitable clay control agents include, but are not limited to, potassium chloride, sodium chloride, and tetramethyl ammonium chloride, and combinations thereof and derivatives thereof.

An example of a treatment fluid of the present invention comprises an aqueous fluid having a temperature of less than about 70° F., CMHPG in an amount in the range of from about 0.1% to about 1% by weight of the aqueous fluid, a zirconium triisopropylamine crosslinking agent in an amount in the range of from about 0.01% to about 2% by weight of the aqueous fluid, a polyhydroxy complex of zirconium in an amount in the range of from about 0.005% to about 0.5% by weight of the aqueous fluid, a mixture of acetic acid and ammonium acetate in an amount in the range of from about 0.005% to about 0.1% by weight of the aqueous fluid, and potassium chloride in an amount of about 7% by weight of the aqueous fluid, wherein the treatment fluid has pH in the range of from about 4 to about 6.

The treatment fluids of the present invention may be prepared using any suitable methodology. In one embodiment, preparation of a particular treatment fluid may comprise admixing a gelling agent with an aqueous fluid, combining a buffer with the resulting fluid to adjust and/or maintain the pH at a desired level for crosslinking and/or hydration of the gelling agent, and then combining a zirconium isopropylamine crosslinking agent with the resulting fluid. The mixing of the zirconium isopropylamine crosslinking agent and/or the second crosslinking agent into the treatment fluid may be performed using any suitable methodology. In some embodiments, the zirconium isopropylamine crosslinking agent and/or the second crosslinking agent may be combined into the treatment fluid "on the fly," for example the crosslinking agents may be injected into a stream of the treatment fluid comprising the aqueous fluid and the gelling agent during pumping. Other additives, such as those described above, may combined with the treatment fluid of the present invention as desired for a particular application.

The treatment fluids may be used for carrying out a variety of subterranean treatments, where a crosslinked treatment fluid may be used, including, but not limited to, fracturing treatments, sand control treatments (e.g., gravel packing), polymer floods, and forming temporary plugs or blocks in subterranean formations, and the like. In some embodiments, the treatment fluids of the present invention may be used in treating a subterranean formation. An example of such a subterranean treating method comprises: providing a treatment fluid of the present invention that comprises an aqueous fluid, a gelling agent, and a zirconium isopropylamine crosslinking agent; and introducing the treatment fluid into a well bore that penetrates a subterranean formation. Crosslinking may occur between at least a portion of the gelling agent and at least a portion of the zirconium isopropylamine crosslinking agent to form at least one crosslink in the gelling agent. In some embodiments, the treatment fluid may contact the subterranean formation at or above a pressure sufficient to create or enhance one or more fractures in at least a portion of the subterranean formation.

In certain embodiments, the treatment fluids of the present invention may be used in subterranean treatments, wherein the aqueous fluid available for use is relatively cool (e.g., less than about 70° F.). An example of such a subterranean treatment method comprises: providing a treatment fluid having a temperature of less than about 70° F., the treatment fluid comprising an aqueous fluid, a gelling agent, and a zirconium isopropylamine crosslinking agent; allowing at least one crosslink to form in the gelling agent while the treatment fluid has a temperature of less than about 70° F. through a reaction that comprises at least a portion of the gelling agent and at least a portion of the zirconium isopropylamine crosslinking agent; and introducing the treatment fluid into a well bore that penetrates a subterranean formation.

The crosslinking may occur, under the appropriate conditions (e.g., pH, temperature, etc.), between at least a portion of the gelling agent and at least a portion of the zirconium isopropylamine crosslinking agent to form at least one crosslink in the gelling agent. In certain embodiments, the crosslinking begins within a few seconds after preparation of the treatment fluid. In certain embodiments, the crosslinking begins after the treatment fluid has been introduced into the well bore. In certain embodiments, the crosslinking may begin shortly after preparation of a particular treatment fluid of the present invention and continue after the treatment fluid has been introduced into the well bore. In some embodiments, the treatment fluid may comprise a second crosslinking agent so that additional crosslinking may occur, for example, crosslinking may occur between at least a portion of the second crosslinking agent and additional portions of the gelling agent to form additional crosslinked gelling agent. This crosslinking comprising the gelling agent and the second crosslinking agent may occur after the treatment fluid, in certain embodiments, is heated above about 70° F. by formation temperatures.

To facilitate a better understanding of the present invention, the following examples of certain aspects of some embodiments are given. In no way should the following examples be read to limit, or define, the scope of the invention.

EXAMPLES

Example 1

Rheological tests were performed using sample fluids prepared as follows. Four sample fluids (Nos. 1-4) were prepared in a Waring Blendor by dissolving a CMHPG gelling agent in tap water containing 2% KCl by weight. The pH of each sample was adjusted to a pH of about 5 using a mixture of acetic acid and ammonium acetate. One or more crosslinking agents were added to each sample just prior to testing.

Viscosity measurements were made using a Fann® Model 50 viscometer equipped with a 420 spring, a 316SS cup, and a B2X bob. Once prepared, 60 ml of the sample fluid at about 75° F. were transferred to the cup and immersed in the preheated bath on the viscometer. The bath was preheated to 125° F. The cup was set in motion at 106 rpm providing a shear rate of 40 sec$^{-1}$ on the sample. The viscometer was programmed to maintain a constant shear rate of 40 sec$^{-1}$ except when performing a shear rate scan. Shear rate scans were measured at 150, 106, 75, 53, 37, 26, and 18 sec$^{-1}$ with 3 minutes at 40 sec$^{-1}$ between scans. A plot of temperature (° F.) and viscosity (cP at 40 sec$^{-1}$) versus time (min) for each sample is provided in FIG. 1.

Sample Fluid No. 1 (control) comprised 25 pounds per thousand gallons (lb/Mgal) of a CMHPG gelling agent, 0.5 gallons per thousand gallons (gal/Mgal) of a zirconium lactate crosslinking agent, 1 gal/Mgal of a mixture of acetic acid and ammonium acetate, and 2% KCl by weight. This sample showed no crosslinking until about 90° F.

Sample Fluid No. 2 (control) comprised 25 lb/Mgal of a CMHPG gelling agent, 0.85 gal/Mgal of a polyhydroxy complex of zirconium, 1 gal/Mgal of a mixture of acetic acid and ammonium acetate, and 2% KCl by weight. This sample showed only a minor degree of crosslinking below 90° F.

Sample Fluid No. 3 comprised 25 lb/Mgal of a CMHPG gelling agent, 0.85 gal/Mgal of a polyhydroxy complex of zirconium, 0.1 gal/Mgal of a zirconium triisopropylamine crosslinking agent, 1 gal/Mgal of a mixture of acetic acid and ammonium acetate, and 2% KCl by weight. When the zirconium triisopropylamine was added to the fluid, the initial viscosity at 73° F. increased from about 200 cP to about 400 cP, indicating crosslinking below 90° F.

Sample Fluid No. 4 comprised 25 lb/Mgal of a CMHPG gelling agent, 0.5 gal/Mgal of a zirconium triisopropylamine crosslinking agent, 1 gal/Mgal of a mixture of acetic acid and ammonium acetate, and 2% KCl by weight. The initial viscosity of this sample was 1300 cP at 74° F., indicating crosslinking below 90° F. Sample Fluid No. 4 showed more shear sensitivity than Sample Fluid Nos. 1-3.

Accordingly, Example 1 indicates that zirconium isopropylamine crosslinking agents may initiate crosslinking at relatively lower temperatures than in fluids that do not contain the zirconium isopropylamine crosslinking agents.

Example 2

Additional rheological tests were performed on several sample fluids utilizing the same shear rate scanning procedure described above in Example 1. For this series of tests, sample fluids were prepared in a Waring Blendor by dissolving 25 lbs/Mgal of a CMHPG gelling agent in tap water containing either 2% KCl by weight, 7% KCl by weight, or 2 gal/Mgal of a tetramethyl ammonium chloride ("TMAC") clay control agent. The pH of each sample was adjusted to a pH of about 5 using 1 gal/Mgal of a mixture of acetic acid and ammonium acetate. Just prior to testing a polyhydroxy complex of zirconium ("PHCZ") and/or a zirconium triisopropylamine crosslinking agent was included in each sample in varying amounts. Upon preparation, the viscosity of the samples was measured using the shear rate scanning procedure described in Example 1 on the Fann® Model 50 viscometer. The viscosity of each sample at 60 minutes and 125° F. is listed in Table 1 below to compare the viscosity of fluid systems containing one or more of the tested crosslinking agents at stable temperature conditions. The results of this test are indicated in Table 1 below.

TABLE 1

| Crosslinking Agent | | Clay Control Agent | | Viscosity |
|---|---|---|---|---|
| PHCZ (gal/Mgal) | Zr(triisopropylamine) (gal/Mgal) | KCl (wt %) | TMAC (gal/Mgal) | at 40 sec$^{-1}$ (cP) |
| 0.8 | 0 | 7 | 0 | 250 |
| 0.8 | 0.1 | 7 | 0 | 318 |
| 0.8 | 0 | 2 | 0 | 450 |
| 0.8 | 0.1 | 2 | 0 | 505 |
| 0 | 0.5 | 2 | 0 | 470 |
| 0.8 | 0 | 0 | 2 | 660 |
| 0.8 | 0.1 | 0 | 2 | 775 |

Accordingly, Example 2 indicates that sample fluids containing both a zirconium isopropylamine crosslinking agent and a polyhydroxy complex of zirconium achieve a higher viscosity at stable temperature conditions when compared to sample fluids containing only a polyhydroxy complex of zirconium.

Example 3

Additional rheological tests were performed on several sample fluids that were prepared as follows. Two sample fluids (Nos. 5 and 6) were prepared in a Waring Blendor by dissolving 25 lbs/Mgal of a CMHPG gelling agent in tap water containing 2 gal/Mgal of a tetramethyl ammonium chloride clay control agent. The pH of each sample was adjusted to a pH of about 5 using 1 gal/Mgal of a mixture of acetic acid and ammonium acetate. Just prior to testing 0.5 gal/Mgal of either a zirconium lactate crosslinking agent or a zirconium triisopropylamine crosslinking agent was added to the sample fluid.

Figure 2:
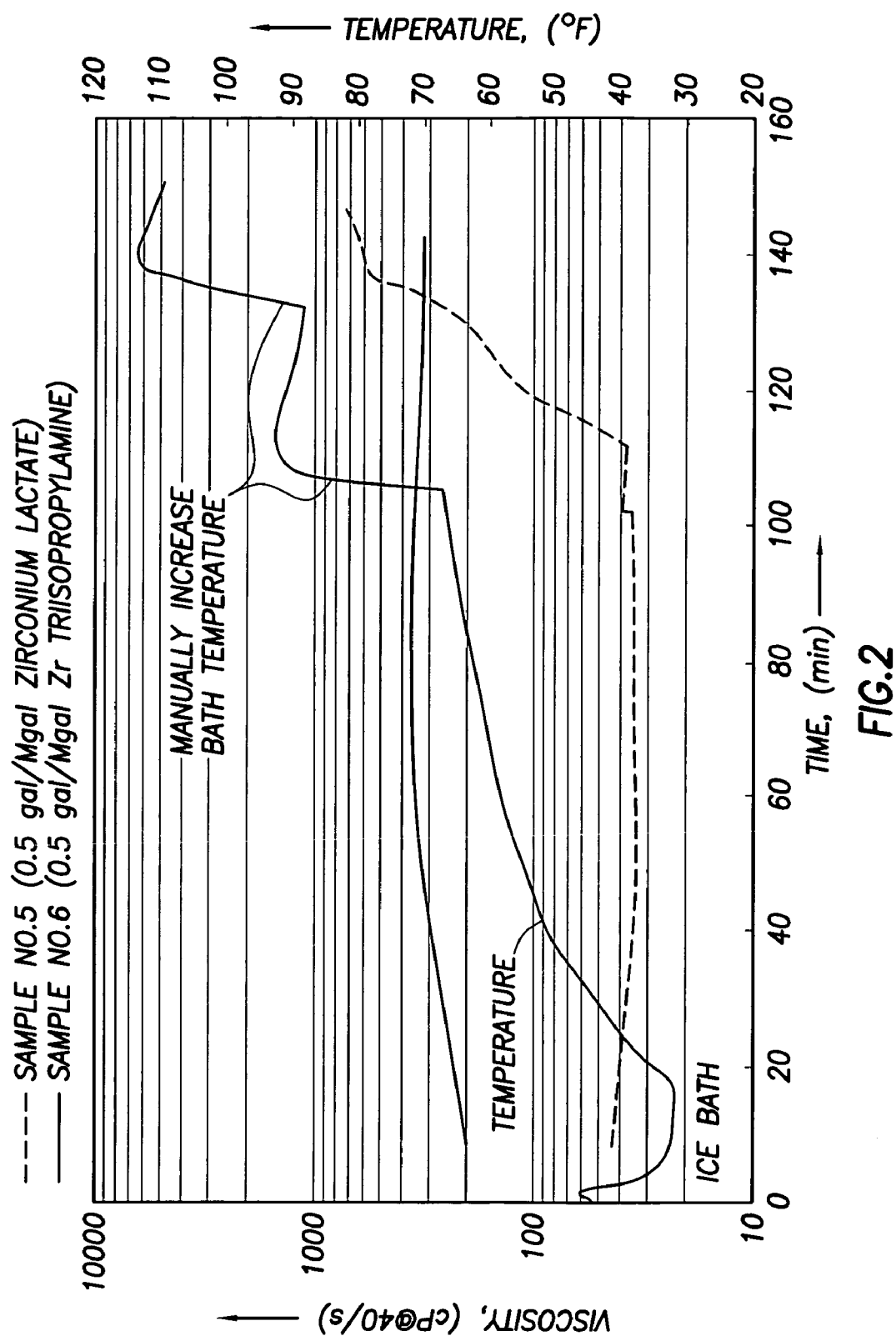
FIG. 2 is a plot of temperature and viscosity versus time as measured using a Fann® Model 50 viscometer for a sample fluid in accordance with one embodiment of the present invention and a control sample fluid.

Viscosity measurements were made using a Fann® Model 50 viscometer equipped with a 420 spring, a 316SS cup, and a B2X bob. Prior to testing, the blender jar, sample fluid, bob, and cup were chilled in an ice bath at 32° F. 60 ml of the chilled sample fluid were transferred to the cup and immersed in the ice bath on the viscometer. The temperature of the cup was allowed to slowly rise. The cup was set in motion at 106 rpm providing a shear rate of 40 sec$^{-1}$ on the sample. The viscometer was programmed to maintain a constant shear rate of 40 sec$^{-1}$. At about 90 minutes and 115 minutes, the ice bath was exchanged for a warm water bath. A plot of temperature (° F.) and viscosity (cP at 40 sec$^{-1}$) versus time (min) for each sample is provided in FIG. 2.

Sample Fluid No. 5 (control) comprised 25 lb/Mgal of a CMHPG gelling agent, 0.5 gal/Mgal of a zirconium lactate crosslinking agent, 1 gal/Mgal of a mixture of acetic acid and ammonium acetate, and 2 gal/Mgal of a tetramethyl ammonium chloride. This sample showed no crosslinking until the sample temperature reached about 90° F.

Sample Fluid No. 6 comprised 25 lb/Mgal of a CMHPG gelling agent, 0.5 gal/Mgal of a zirconium triisopropylamine crosslinking agent, 1 gal/Mgal of a mixture of acetic acid and ammonium acetate, and 2 gal/Mgal of a tetramethyl ammonium chloride. This sample showed crosslinking below 40° F.

Accordingly, Example 3 indicates that zirconium isopropylamine crosslinking agents may initiate crosslinking at relatively lower temperatures than in fluids that do not contain the zirconium isopropylamine crosslinking agents.

Example 4

Crosslinking tests were performed on sample fluids that were prepared as follows. For this series of tests, sample fluids were prepared in a Waring Blendor by dissolving 40 lbs/Mgal of a CMHPG gelling agent in tap water containing 7% KCl by weight. The pH of each sample was adjusted to a pH of about 5 using a mixture of acetic acid and ammonium acetate in an amount of 1 gal/Mgal. Thereafter, 250 ml of the sample fluid were transferred to a 500 ml glass blender jar that was placed on a Chandler blender base, set to turn at 2,200 rpm. The temperature of the jar and the sample was adjusted as indicated in Table 2 for the vortex closure tests. After placement in the blender jar, one or more crosslinking agents were added to each sample, and the time to close the vortex and to achieve a static dome, also referred to as rollover, was measured. The type and amount of crosslinking agent included each sample were varied. The crosslinking agents tested included those that supply zirconium IV ions and those that supply titanium ions. Next, the sample fluid was transferred to a beaker and heated to 90° F. in a water bath while stirring. The qualitative elastic (lipping) character of the sample fluid was observed as the temperature of the sample fluid increased. The lipping character of each sample fluid was observed at temperature.

The results of this series of test are indicated in Table 2.

TABLE 2

| Crosslinking Agent | | Vortex Closure Tests | | | Lipping Tests | |
|---|---|---|---|---|---|---|
| Type | Conc. (wt. %) | Temperature (° F.) | Vortex Closure (min:sec) | Rollover (min:sec) | Temperature (° F.) | Observation |
| Zr Lactate[1] | 0.08 | 75.2 | 0:05 | >3:00 | 90 | Very Weak Lip |
| Zr Lactate[2] | 0.08 | — | >10:00 | — | 91 | Weak Lip |
| Zr(ammonium acetate) | 0.08 | 77.5 | 0:06 | ~1:00 | 85 | Strong-Brittle |
| Ti(ortho ester complex) | 0.08 | 77.6 | >10:00 | — | 90 | Very Weak Lip |
| Ti Lactate | 0.08 | 78 | >10:00 | — | 90 | No Lip |
| Ti(slurry complex) | 0.08 | 78.5 | >10:00 | — | 90 | No Lip |
| Zr (Al Lactate) | 0.08 | 75.2 | 2:00 | ~10:00 | 90 | Weak Lip |
| Zr(diisopropylamine) | 0.08 | 74.3 | 0:06 | 0:12 | 75 | Very Strong |
| Zr(diisopropylamine) | 0.08 | 51 | 0:15 | 0:43 | 56 | Weak Lip |
| Zr(triisopropylamine) | 0.08 | 78.3 | 0:06 | 0:08 | 78 | Very Strong |
| Zr(triisopropylamine) | 0.08 | 49 | 0:09 | 0:27 | 56 | Strong |
| Zr(triisopropylamine) | 0.08 | 55 | 0:11 | ~1:20 | 60 | Weak Lip |
| Zr(triisopropylamine) | 0.02 + | 48 | 0:12 | ~3:00 | 54 | Very Weak Lip |

TABLE 2-continued

| Crosslinking Agent | | Vortex Closure Tests | | | Lipping Tests | |
|---|---|---|---|---|---|---|
| Type | Conc. (wt. %) | Temperature (° F.) | Vortex Closure (min:sec) | Rollover (min:sec) | Temperature (° F.) | Observation |
| Zr(triethanolamine-glycolate) | 0.12 | | | | 60 | Moderate Lip |
| | | | | | 70 | Strong Lip |

[1] The Zirconium Lactate used in this sample fluid was CL-23 ™ crosslinking agent, a product of Halliburton Energy Services.
[2] The Zirconium Lactate used in this sample fluid was Tyzor ® 217 organic titanate, commercially available from Dupont Specialty Chemicals.

Accordingly, Example 4 indicates that zirconium isopropylamine crosslinking agents may initiate crosslinking at relatively lower temperatures than in fluids that do not contain the zirconium isopropylamine crosslinking agents.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A treatment fluid, comprising:
   an aqueous fluid at a temperature of less than about 75° F;
   a gelling agent; and
   a zirconium triisopropylamine crosslinking agent.

2. The treatment fluid of claim 1 wherein the aqueous fluid has a temperature of less than about 70° F.

3. The treatment fluid of claim 1 wherein the aqueous fluid has a temperature of less than about 60° F.

4. The treatment fluid of claim 1 wherein the gelling agent comprises at least one of the following: a guar gum; hydroxyethyl guar; hydroxypropyl guar; carboxymethyl guar; carboxymethylhydroxyethyl guar; carboxymethylhydroxypropyl guar; a cellulose derivative; hydroxyethyl cellulose; carboxyethylcellulose; carboxymethylcellulose; carboxymethylhydroxyethylcellulose; a cellulose grafted with an allyl or a vinyl monomer; polyacrylate; polymethacrylate; polyacrylamide; polyvinyl alcohol; or polyvinylpyrrolidone; or a derivative thereof.

5. The treatment fluid of claim 1 wherein the gelling agent comprises an organic carboxylated gelling agent.

6. The treatment fluid of claim 1 wherein the gelling agent comprises carboxymethylhydroxypropyl guar.

7. The treatment fluid of claim 1 wherein the zirconium triisopropylamine crosslinking agent is present in the treatment fluid in an amount in the range of from about 0.01% to about 2% by weight of the aqueous fluid.

8. The treatment fluid of claim 1 wherein the treatment fluid has a pH between about 4 and about 6.

9. The treatment fluid of claim 1 wherein the treatment fluid further comprises a second crosslinking agent.

10. The treatment fluid of claim 9 wherein the second crosslinking agent comprises at least one of the following: compounds that can supply boron ions; compounds that can supply zirconium IV ions; compounds that can supply titanium IV ions; aluminum compounds; antimony compounds; chromium compounds; iron compounds; copper compounds; or zinc compounds; or a derivative thereof.

11. The treatment fluid of claim 1 wherein the treatment fluid further comprises at least one of the following: a buffer; a clay control agent; a gas; a foaming agent; or a delayed gel breaker.

12. The treatment fluid of claim 1 wherein the gelling agent comprises carboxymethylhydroxypropyl guar; wherein the fluid further comprises a zirconium IV-containing crosslinking agent; wherein the fluid further comprises a buffer that comprises a mixture of acetic acid and ammonium acetate; and wherein the fluid further comprises a clay control agent.

13. A treatment fluid, comprising:
    an aqueous fluid at a temperature of less than about 75° F.;
    a buffer;
    a clay control agent;
    an organic carboxylated gelling agent;
    a zirconium triisopropylamine crosslinking agent;
    and a zirconium IV-containing crosslinking agent;
    wherein the treatment fluid has a pH in the range of from about 4 to about 6.

14. The treatment fluid of claim 13 wherein the aqueous fluid has a temperature of less than about 70° F.

15. The treatment fluid of claim 13 wherein the zirconium triisopropylamine crosslinking agent is present in the treatment fluid in an amount in the range of from about 0.01% to about 2% by weight of the aqueous fluid.

16. The treatment fluid of claim 13 wherein the gelling agent comprises at least one of the following: a guar gum; hydroxyethyl guar; hydroxypropyl guar; carboxymethyl guar; carboxymethylhydroxyethyl guar; carboxymethylhydroxypropyl guar; a cellulose derivative; hydroxyethyl cellulose; carboxyethylcellulose; carboxymethylcellulose; carboxymethylhydroxyethylcellulose; a cellulose grafted with an allyl or a vinyl monomer; polyacrylate; polymethacrylate; polyacrylamide; polyvinyl alcohol; or polyvinylpyrrolidone; or a derivative thereof.

17. The treatment fluid of claim 13 wherein the gelling agent comprises an organic carboxylated gelling agent.

18. The treatment fluid of claim 13 wherein the gelling agent comprises carboxymethylhydroxypropyl guar.

19. A crosslinking agent, comprising:
    a zirconium triisopropylamine crosslinking agent; and
    a zirconium IV-containing crosslinking agent;
    wherein the zirconium triisopropylamine crosslinking agent will react with a gelling agent at a temperature of less than about 75° F.

20. The crosslinking agent of claim 19 wherein the zirconium IV-containing crosslinking agent comprises at least one of the following: zirconium lactate; zirconium lactate triethanolamine; zirconium carbonate; zirconium acetylacetonate; zirconium malate; zirconium citrate; or a polyhydroxy complex of zirconium.

* * * * *